Figure 4:
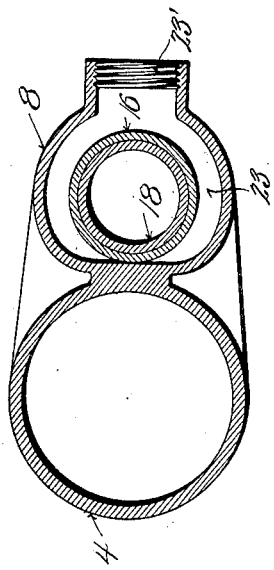

W. S. HARLEY.
INTERNAL COMBUSTION ENGINE OF THE COMPRESSION TYPE.
APPLICATION FILED DEC. 19, 1911.
1,089,128.
Patented Mar. 3, 1914.
4 SHEETS—SHEET 1.
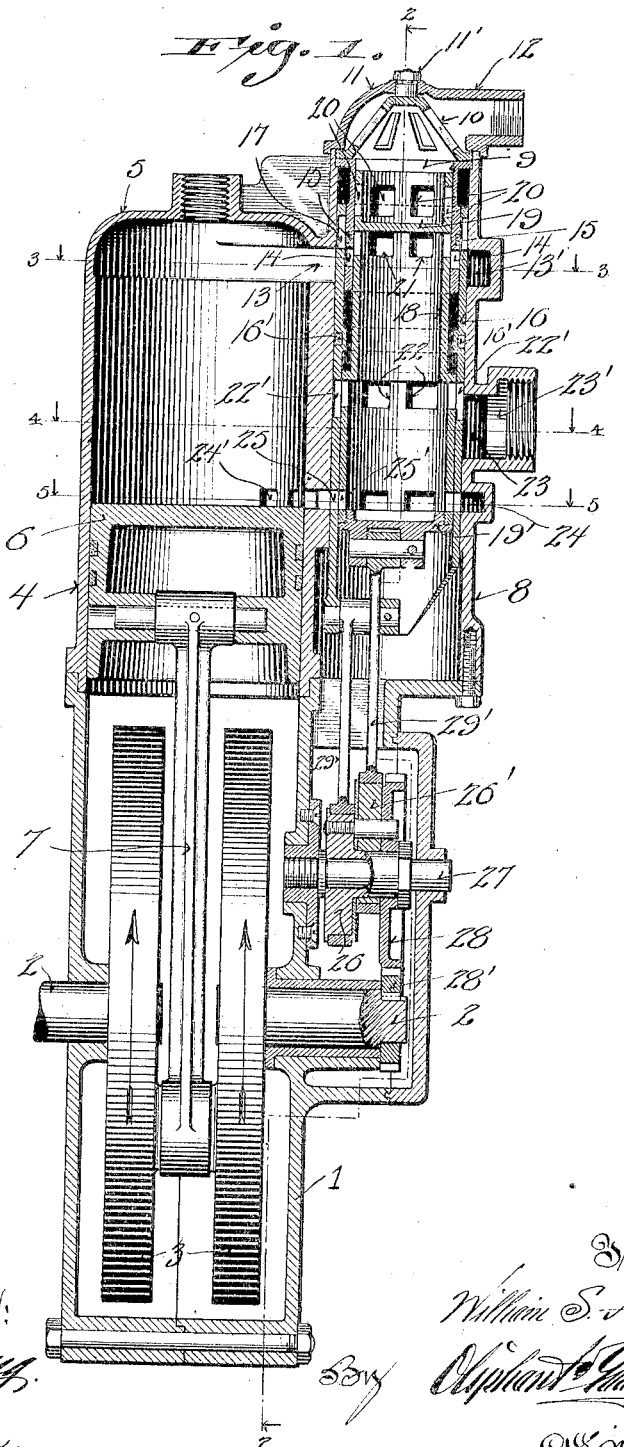

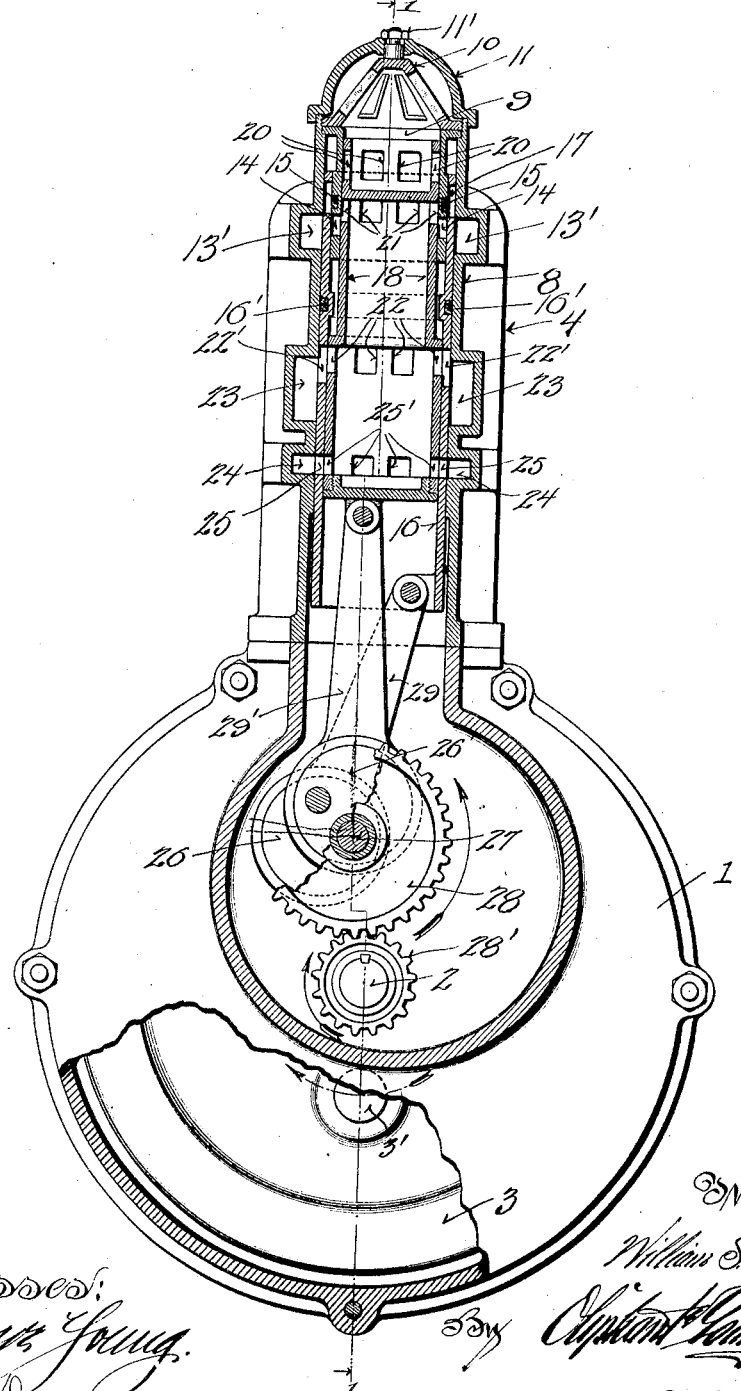

W. S. HARLEY.
INTERNAL COMBUSTION ENGINE OF THE COMPRESSION TYPE.
APPLICATION FILED DEC. 19, 1911.

1,089,128.

Patented Mar. 3, 1914.
4 SHEETS—SHEET 3.

Witnesses:

Inventor:
William S. Harley
By
Attorneys

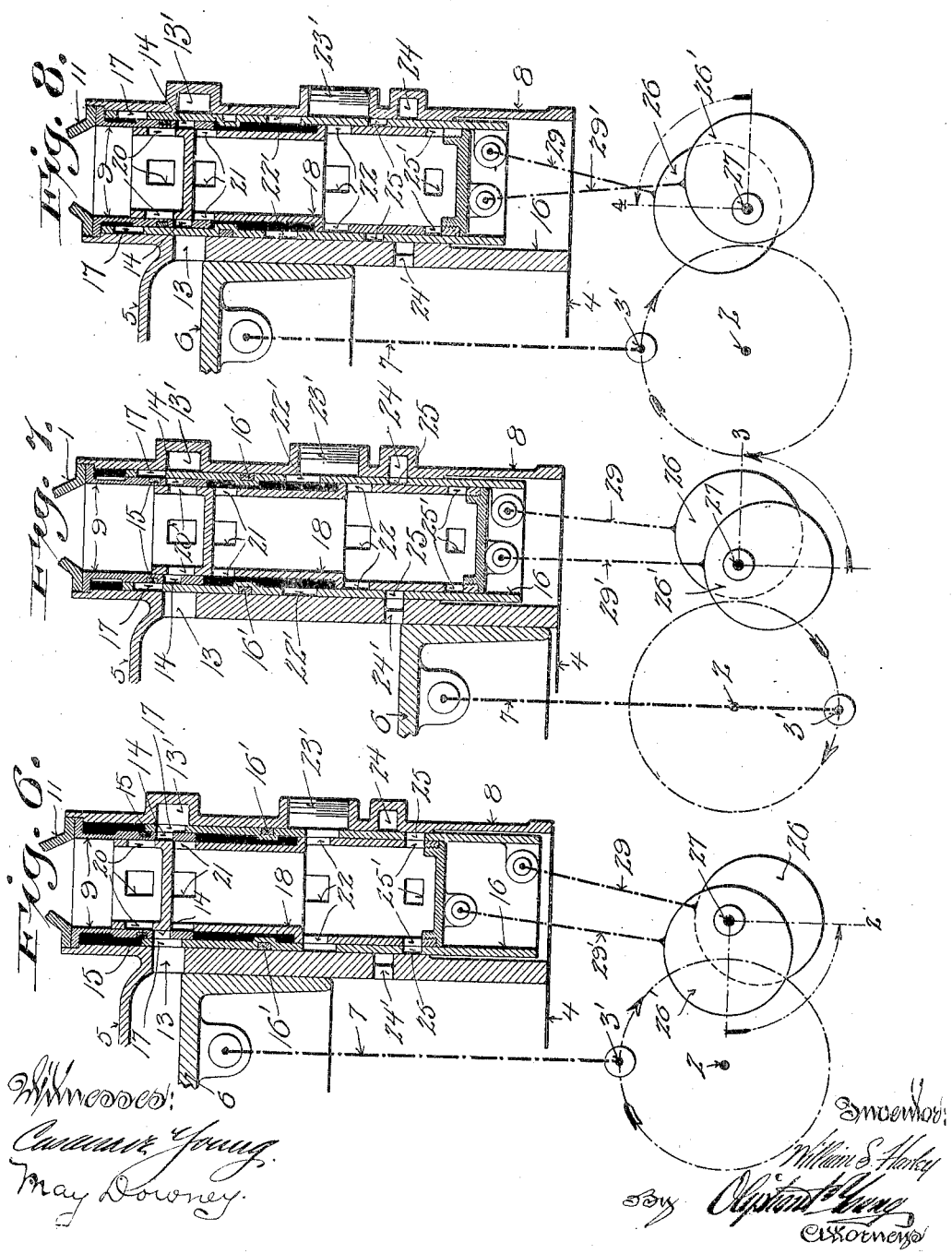

UNITED STATES PATENT OFFICE.

WILLIAM S. HARLEY, OF MILWAUKEE, WISCONSIN.

INTERNAL-COMBUSTION ENGINE OF THE COMPRESSION TYPE.

1,089,128. Specification of Letters Patent. Patented Mar. 3, 1914.

Application filed December 19, 1911. Serial No. 666,787.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Internal-Combustion Engines of the Compression Type; and I do hereby declare that the following is a full, clear, and exact description thereof.

My invention refers to internal combustion engines of the compression type, its object being to increase the efficiency of an engine of this type by providing simple, economical and effective positively actuated valve mechanism, the construction and arrangement being such that the intake and exhaust ports are controlled by positively actuated balanced cylindrical shells, which shells are adapted to co-actingly reciprocate within a valve-chest that is disposed parallel to the engine cylinder whereby economy in construction and great efficiency in the operation of the engine is insured irrespective of its speed.

I am aware that reciprocative open ended sleeves or shells have been placed within engine cylinders and in telescopic union with a working piston for controlling the motive fluids, such arrangement being shown in the patent to W. H. Clark for hydraulic engines, dated March 12, 1878, No. 201,095, and to E. E. Slick for improvements in blowing, dated March 14, 1899, No. 620,983, and that certain adaptations of this type of valve control have been utilized in connection with internal combustion engines, but owing to the intense heat generated within the explosive head of a gas engine cylinder and the direct internal explosive force to which the valve shell or sleeve in this instance is subjected, it has been found that an uneven expansion and strain upon the sleeve longitudinally will result, whereby the full efficiency of an engine so arranged is impaired due to friction, wear and consequent deterioration through leakage upon the high pressure strokes of the piston.

By my improved construction the valve shells are distinctly removed from the direct influences of heat generated in the engine cylinder and are thus maintained at a more uniform and lower temperature whereby friction is eliminated while at the same time tight joints between the valve members is insured at all times, it being understood that provision is also made for balancing the valve members by exposing the same to uniform external pressure incidental to the working and compression strokes of the engine piston. Furthermore it has been found that where the valve-shells are jacketed about the working piston of an engine where said working piston imparts motion to a crank through an oscillatory piston-rod, that the side thrust upon the piston owing to said crank movement will subject the valve-shells to irregular side pressure whereby they will be subjected to great wear which in time will cause them to lose their efficiency as valve members. By segregating the valve-shells in the manner proposed this objectionable feature is entirely eliminated.

Specific objects of my invention are to provide a fixed sleeve at the head of the valve-chest having a common intake and exhaust port in the form of a grid, the fixed sleeve being interposed between inner and outer valve-shells whereby its port co-acts with a similar common intake and exhaust port of the outer valve-shell which shell is in slidable engagement with the walls of the valve-chest while the fixed sleeve and inner shell at the head end of the valve-chest are in nested engagement with said outer shell; to provide an inner valve-shell that is in telescopic union with the outer shell having an upper head adapted to co-act with the fixed sleeve ports and to control the admission of combustible fluid to the engine cylinder in conjunction with the common intake and exhaust port of the outer valve-shell; to provide a lower head for the inner valve-shell whereby the same constitutes a shiftable exhaust pocket between its heads; to provide an exhaust port below the upper head of the inner valve-shell, which exhaust port in conjunction with the intake and exhaust ports of the fixed sleeve and outer shell respectively permits the free exhaust of spent gases from the firing end of the engine cylinder; to provide a common intake and exhaust chamber disposed adjacent to the head end of the valve-chest and in communication with the firing end of the engine cylinder, the same being under control of the common intake and exhaust ports of the outer valve shell, fixed sleeve and head exhaust ports of the inner shell, whereby said outer shell is exposed and balanced with reference to external force of high pressure fluids directed from the engine cylinder; to provide coöperating exhaust ports in the outer and inner valve-shells intermediate of the heads of the latter for directing spent gases from the pocket portion of the inner shell to an atmospherically vented main exhaust chamber that is disposed about the outer valve-shell and formed in the valve-chest; to provide a second set of exhaust ports at the lower ends of the valve-shells, which exhaust ports are adapted to communicate with an auxiliary exhaust chamber arranged about the lower end of the valve-chest and in communication with the lower end of the engine cylinder, whereby spent gases are initially freed from said cylinder incidental to completion of the working stroke of the piston, the intermediate or centrally located set of exhaust ports of the inner and outer shells serving to conduct said spent gases to the main exhaust chamber. Hence it will be seen that the exploded vapor from the cylinder is first released at the end of the working stroke of the piston, from which point of release it travels upwardly through the inner shell pocket to atmosphere and thereafter the remainder of said spent gases are cleared from the firing end of the cylinder through the upper exhaust ports of the inner shell in a reverse direction due to registration of said exhaust ports with the fixed sleeve port and common intake and exhaust port of the outer shell.

With the above objects in view the invention consists in certain peculiarities of construction and combination of parts as clearly set forth hereinafter with reference to the accompanying illustrations and subsequently claimed.

Figure 5:
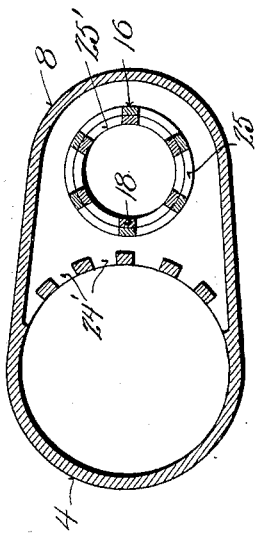
Figure 3:
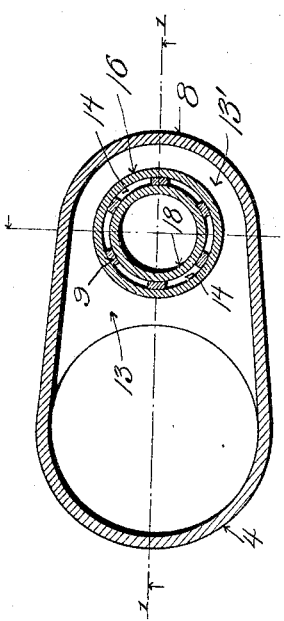

In the drawings Figure 1 represents a longitudinal central sectional elevation of a gas engine embodying the features of my invention, the section being indicated by lines 1—1 of Figs. 2 and 3; certain of the parts being broken away to more clearly show structural features and other parts being in full; Fig. 2, a side elevation of the same with parts broken away and parts in section, the plane of the section being indicated by lines 2—2 of Figs. 1 and 3; Fig. 3, a detailed cross-section of the engine, the section being indicated by line 3—3 of Fig. 1; Fig. 4, a similar cross-section, the section being indicated by line 4—4 of Fig. 1; Fig. 5, a cross-section upon another plane of the engine, the section being indicated by line 5—5 of Fig. 1, and Figs. 6, 7 and 8 represent fragmentary section views of the valve mechanism in connection with the engine cylinder diagrammatically illustrating different positions assumed by the valve mechanism with relation to the working piston.

Referring by characters to the drawings, 1 represent a crank casing provided with journals for a crank-shaft 2, the crank portion of which shaft is shown in the form of a pair of disks 3 that are connected by a crank-pin 3'. The crank casing has secured thereto an engine cylinder 4 having a closed firing head 5, the cylinder being provided with a working piston 6 that is connected to the crank-pin 3' by an oscillatory pitman 7, all of which construction is of standard type and forms no part of my invention.

The engine cylinder is formed with a cylindrical valve-chest 8 that is arranged parallel thereto, and secured within the upper or head end of the valve-chest is a fixed sleeve 9, the same being cylindrical and of lesser exterior diameter than the bore of the valve-chest. The fixed sleeve is provided with a flanged end which is seated within a shoulder of the valve-chest head end, the flange being secured thereto by a spider 10 which is in threaded union with said valve-chest. A head closure 11 is fitted over the upper end of the valve-chest and is held to its seat by a retaining nut 11' which is in threaded engagement with a central shank that extends from the spider, the said head being provided with a fluid intake nozzle 12 whereby explosive gases are fed to the valve-chest.

As clearly shown in Figs. 1 and 3 of the drawings the firing end of the cylinder is provided with an intake and exhaust port 13 which communicates with an intake and exhaust chamber 13' that is disposed about and adjacent to the upper end of the valve-chest. The inner wall of the intake and exhaust chamber is formed by the spaced fixed sleeve 9, the lower end of which fixed sleeve extends slightly below the bottom edge of the intake and exhaust chamber. The fixed sleeve is provided with a common intake and exhaust port 14 in the form of a series of radial apertures that are disposed upon the same horizontal plane as the intake and exhaust chamber 13', there being a packing ring 15 seated within a recess that is formed in the outer circular walls of the sleeve just above its intake and exhaust port. An outer valve-sleeve 16 is slidably mounted within the valve-chest, its upper end being adapted to have sliding fit within the space intervening between the inner wall of the valve-chest and outer wall of the fixed sleeve, whereby a telescopic union is effected. Adjacent to the upper end of the outer valve-shell the same is provided with a series of common intake and exhaust ports 17, which are adapted to be moved in and out of register with the sleeve ports and the intake and exhaust valve-chest chamber 13'.

A second inner valve-shell 18 is in telescopic union with the outer valve-shell and inner face of the fixed sleeve 9, the said inner valve-shell being provided with a head closure 19, which, in this instance is shown provided with an upwardly extending flange having a series of port-holes 20 therein that are adapted to be moved in and out of register with the fixed sleeve port-holes 14. The head closure 19, in conjunction with the head 11 of the valve-chest thus forms a receiving chamber for the explosive gases that are admitted to the engine cylinder. Just below the head closure 19 the inner valve-shell is provided with a series of exhaust port openings 21, which ports are also adapted to be moved in and out of register with the fixed sleeve ports 14. The lower end of the inner sleeve is also closed by a head 19' whereby the space between said heads constitutes a pocket for spent gases. Intermediate of the heads the inner sleeve is also provided with a series of exhaust ports 22, which ports are adapted to co-act with a similar set of ports 22' in the outer valve-shell for cutting off and establishing communication between the inner valve-shell and a main exhaust chamber 23 that is formed in the valve-chest about the exterior face of the outer valve-shell, the main exhaust chamber being provided with a nozzle 23' whereby the spent gases are vented.

In order to free the engine cylinder from exhaust gases as quickly as possible after the working stroke of the piston has been completed, I provide a second auxiliary exhaust chamber 24 which is formed in the inner walls of the valve-chest below the main exhaust chamber, the auxiliary exhaust chamber being connected to the lower end of the engine cylinder 4 by a port 24', which port as shown is in the form of a grid. Communication between the auxiliary exhaust chamber and main exhaust chamber is established through a set of exhaust ports 25 in the outer valve-shell and a corresponding set 25' in the inner valve-shell, which ports are adapted to be brought into register with the auxiliary chamber incidental to completion of the working stroke of the piston whereby the spent gases are initially discharged through the inner valve pocket in an upward direction and from thence through the exhaust ports 22, 22' to the main exhaust chamber as best shown in Fig. 1 of the drawings.

In order to insure a tight joint to prevent leakage between the inner walls of the valve-chest and exterior walls of the outer valve-shell, as shown, the said exterior walls of the valve-shell are grooved for the reception of a packing ring 16' whereby leakage is effectually cut off between the upper common intake and exhaust chamber 13' and the main exhaust chamber 23' of said valve-chest.

My invention is designed and as shown is applied to a four cycle engine and in order to positively actuate the valve-shells in proper time with relation to the working piston I have provided a double faced eccentric 26, 26', which eccentric is revolubly mounted upon a stud 27, the eccentric carrying a large gear-wheel 28 that meshes with a pinion 28', which pinion is mounted upon the crank-shaft 2, whereby a two to one gear connection is effected, it being apparent that with each complete rotation of the eccentric that the crank-shaft will have made two revolutions. It is also apparent that an ordinary crank may be substituted for the double eccentrics shown. These eccentrics are set in advance of each other approximately 90°, the advanced eccentric 26 being connected by a strap 29 to the lower end of the outer valve-shell 16. The following eccentric 26' is similarly connected by a strap 29' to the lower head 19' of the inner valve-shell, it being understood that the eccentrics travel in the direction indicated by the arrows in the several views and owing to the gear connection that said direction is in a reverse from that traveled by the crank-shaft.

In a complete cycle of the engine by referring first to Figs. 1 and 2, the operation is as follows: In said figures the piston has just completed its working stroke and the relative position of the eccentrics to the crank of the engine-shaft is such that the inner valve-shell as shown has completed its upward movement, while the advanced eccentric 26 has completed half of its downward stroke, which advanced eccentric is connected with the outer valve-shell and consequently the same is moving downward at its maximum speed. The exhaust ports 25 and 25' of the valve-shells are at this time in register with the auxiliary exhaust chamber 24 and owing to the fact that the ports 24' are exposed by the piston the spent products will pass from the engine cylinder up through the inner cylinder and from thence through the exhaust ports 22, 22', to the main exhaust chamber, it being understood that the last mentioned exhaust ports are also now in register. Owing to the position of the crank-pin for a short interval of time there will be slight upward movement of the working piston and also, owing to the position of the eccentric 26' there will be a similar delay in downward movement of the inner valve-shell which is connected to said eccentric 26' and during this inaction of the working piston and inner valve-shell the outer valve-shell will have a quick downward movement caused through the advanced position of its operating eccentric 26, incidental to which movement the common intake and exhaust port 17 of the shell will have established communication between the common intake and exhaust chamber 13' and to the pocket portion of the inner valve-shell through port 14 of the fixed sleeve and the exhaust ports 21 of said inner sleeve. Hence it will be seen that as the working piston rises on its exhaust stroke the spent gases which had not previously been expelled will be forced out through the intake and exhaust chamber and downwardly through the pocket of the inner valve-shell to the main exhaust, the spent gases traveling in the reverse direction from that previously described and when the working piston has completed its exhaust stroke the valve members assume the position shown in the diagram Fig. 6, in which position the eccentrics controlling said members have made one-quarter of a revolution from the position shown in Fig. 2 of the drawings, the eccentric 26′ having caused the inner valve-shell to move downwardly with a quick stroke, while the eccentric which controls the outer sleeve is practically at rest. In this position the inner valve-shell exhaust ports owing to their sliding engagement with the fixed sleeve have cut off the upper exhaust communication. While the working piston is delayed in its downward stroke a further movement of the valve member eccentrics will cause the inner sleeve to travel down quickly whereby the intake ports 20 above the head 19 will be brought into register with the fixed sleeve ports 14 and thus communication is opened between the firing end of the cylinder and the fluid intake end of the valve-chest, it being observed that while this quick opening movement of the inner valve-shell takes place that the outer valve-shell ports which are in register with the intake and exhaust chamber 13′ will remain practically stationary. The working piston will now move downwardly upon its suction stroke and during its travel the outer valve-shell will move upwardly and cut off communication between the intake end of the valve-chest and firing end of the cylinder, complete cut-off taking place as the piston reaches the limit of its downward movement. In this position there will be practically no movement of the inner valve-shell and although the lower exhaust ports 25 in the outer valve-shell are in register with the auxiliary exhaust chamber the corresponding ports in the inner cylinder are a considerable distance below, whereby the exhaust communication is closed. A compression stroke of the working piston now starts, as shown in the diagram view Fig. 7, and during said compression stroke, as shown in diagram view Fig. 8, the outer sleeve continues to move upwardly whereby port 13 of the engine cylinder is held closed and all communication between the upper or feed end of the valve-chest is cut off from the common intake and exhaust chamber. Hence, as shown in the diagram view Fig. 8, the compressed gases will be distributed between the face of the piston and head of the engine cylinder and about the outer valve-shell. The compressed charge is now ignited by any suitable means and the piston starts on its working stroke upon the completion of which the valve elements assume the positions shown in Figs. 1 and 2, whereby the four cycle movement of the engine is effected.

It will be observed that when the explosion takes place in the firing end of the cylinder that the force is exerted equally about the outer valve sleeve and is thus neutralized whereby the valve members are balanced, this balance being also effected upon the compression stroke of the piston in such manner that there is no tendency of the valve-shell members being expanded by force and, furthermore, owing to the fact that the valve members are placed outside of the cylinder they will be maintained at a comparatively low temperature, it being also advantageous in the assemblage to place the valve members in the position stated, whereby access may be had thereto.

I claim:

1. An internal combustion engine comprising a cylindrical valve-chest provided with a common intake and exhaust chamber and a main exhaust chamber, the chambers being disposed upon different planes, an engine cylinder having its firing end in communication with the common intake and exhaust chamber, a fixed ported sleeve extending into the valve-chest in juxtaposition to the intake and exhaust chamber, outer and inner valve-shells in slidable union with each other and having ends adapted to co-act with the fixed ported sleeve, the shells being provided with co-acting ports arranged to cover and uncover the fixed sleeve ports and having other co-acting ports arranged to control communication with the main exhaust chamber of the valve chest, a closure head for the inner valve-shell between its sets of port openings adapted to cover and uncover the fixed shell ports, and a gas receiving head above the closure head.

2. An internal combustion engine comprising a cylinder, a piston therein, a cylindrical valve-chest provided with a common intake and exhaust chamber disposed about its inner walls having a port in communication with the firing end of the engine cylinder, the valve-chest being also provided with a main exhaust chamber and an auxiliary exhaust chamber at different distances from the common intake and exhaust chamber, the auxiliary exhaust chamber being in communication with the lower end of the engine cylinder, a closed receiving head in connection with that end of the valve-chest in juxtaposition to the aforesaid common intake and exhaust chamber, a depending fixed sleeve carried by said valve-chest located adjacent to the receiving head and spaced from the inner walls of the aforesaid chest, the fixed sleeve being provided with port openings for communication with the valve-chest intake and exhaust chamber, a reciprocative outer valve-shell in telescopic engagement with the valve-chest and outer wall of the fixed sleeve, the said outer valve-shell being provided with common intake and exhaust ports adapted to control communication between the fixed shell ports and common intake and exhaust chamber, and two sets of exhaust ports spaced at different distances below the common intake and exhaust ports for establishing communication between the main and auxiliary exhaust chambers, an inner valve-shell in telescopic union with the outer shell and fixed sleeve, a head closure for the inner valve-shell adapted to control communication between the receiving end of the valve-chest and fixed sleeve ports, the said inner valve-shell being provided with two sets of exhaust ports below its head closure adapted to register with the two sets of exhaust ports of the aforesaid outer shell, and a closure for the opposite end of the inner valve-shell.

3. In an internal combustion engine comprising a cylinder, a piston therein, an actuating crank for the piston, a cylindrical valve-chest provided with a common intake and exhaust chamber disposed about its inner wall having a port in communication with the firing end of the engine cylinder and having a main exhaust chamber and auxiliary exhaust chamber spaced respectively below the first mentioned chamber, the auxiliary exhaust chamber being in communication with the lower end of the engine cylinder, a closed fluid receiving head in connection with one end of the valve-chest, a fixed sleeve carried by said valve-chest in juxtaposition to its closed receiving head and spaced from the inner wall of said chest, the fixed sleeve being provided with port openings, an outer valve-shell in telescopic union with the valve-chest and outer wall of the fixed sleeve, the said valve-shell being provided with three sets of ports the upper set being adapted to establish communication with the common intake, the lower set being adapted to establish communication with the auxiliary exhaust port, the intermediate set being adapted to establish communication with the main exhaust chamber of the valve-chest, an inner valve-shell in telescopic union with the outer shell and fixed sleeve, a head closure for the inner valve-shell having a ported flanged extension adapted to control communication between the receiving end of the valve-chest and fixed sleeve ports, the said inner valve-shell being also provided with separate sets of exhaust ports below its head closure for covering and uncovering the separate sets of outer shell exhaust ports, a closure for the opposite end of the inner valve-shell, and actuating eccentrics for the valve-shells in gear connection with the engine crank-shaft.

In testimony that I claim the foregoing I have hereunto set my hand at Milwaukee, in the county of Milwaukee and State of Wisconsin, in the presence of two witnesses.

WILLIAM S. HARLEY.

Witnesses:
  MAY DOWNEY,
  GEO. W. YOUNG.